US009606720B1

(12) United States Patent
Asver et al.

(10) Patent No.: US 9,606,720 B1
(45) Date of Patent: Mar. 28, 2017

(54) SYSTEM AND METHOD FOR PROVIDING A PREVIEW OF A DIGITAL PHOTO ALBUM

(71) Applicant: Google Inc., Mountain View, CA (US)

(72) Inventors: Ajmal Arshan Asver, San Francisco, CA (US); Chandrashekar Raghavan, San Francisco, CA (US); Denise K. Ho, Los Altos, CA (US); Darwin Kengo Yamamoto, San Francisco, CA (US); Aaron Schurman, San Jose, CA (US)

(73) Assignee: Google Inc., Mountain View, CA (US)

( * ) Notice: Subject to any disclaimer, the term of this patent is extended or adjusted under 35 U.S.C. 154(b) by 317 days.

(21) Appl. No.: 14/057,965

(22) Filed: Oct. 18, 2013

Related U.S. Application Data

(60) Provisional application No. 61/745,499, filed on Dec. 21, 2012.

(51) Int. Cl.
G06F 3/0488 (2013.01)
G06F 3/0485 (2013.01)
G06F 3/0482 (2013.01)

(52) U.S. Cl.
CPC .......... *G06F 3/0488* (2013.01); *G06F 3/0482* (2013.01); *G06F 3/0485* (2013.01)

(58) Field of Classification Search
CPC .... G06F 3/017; G06F 3/04817; G06F 3/0482; G06F 3/04842
USPC ............. 715/764, 784, 788, 810, 835, 863
See application file for complete search history.

(56) References Cited

U.S. PATENT DOCUMENTS

| 8,669,945 | B2* | 3/2014 | Coddington | G06F 3/0485 345/173 |
| 2002/0154147 | A1* | 10/2002 | Battles | G06T 11/60 345/660 |
| 2008/0052945 | A1* | 3/2008 | Matas | G06F 3/0485 34/173 |
| 2011/0163971 | A1* | 7/2011 | Wagner | G06F 3/04817 345/173 |
| 2011/0234543 | A1* | 9/2011 | Gardenfors | G06F 3/005 345/175 |
| 2013/0159941 | A1* | 6/2013 | Langlois | G06F 3/017 715/863 |

* cited by examiner

*Primary Examiner* — Christopher J Fibbi
(74) *Attorney, Agent, or Firm* — McDermott Will & Emery LLP

(57) ABSTRACT

A system and method for providing a preview of a digital photo album is provided. A representation of a digital photo album, which includes plural content items is displayed on an electronic device. An interaction associated with the displayed representation of the digital photo album is detected on the electronic device. A determination of whether the interaction corresponds to a gesture that is maintained for a first threshold distance is made. A preview of the digital photo album is provided for display in response to the determination, where the preview includes one or more of the plural content items included within the digital photo album.

15 Claims, 5 Drawing Sheets

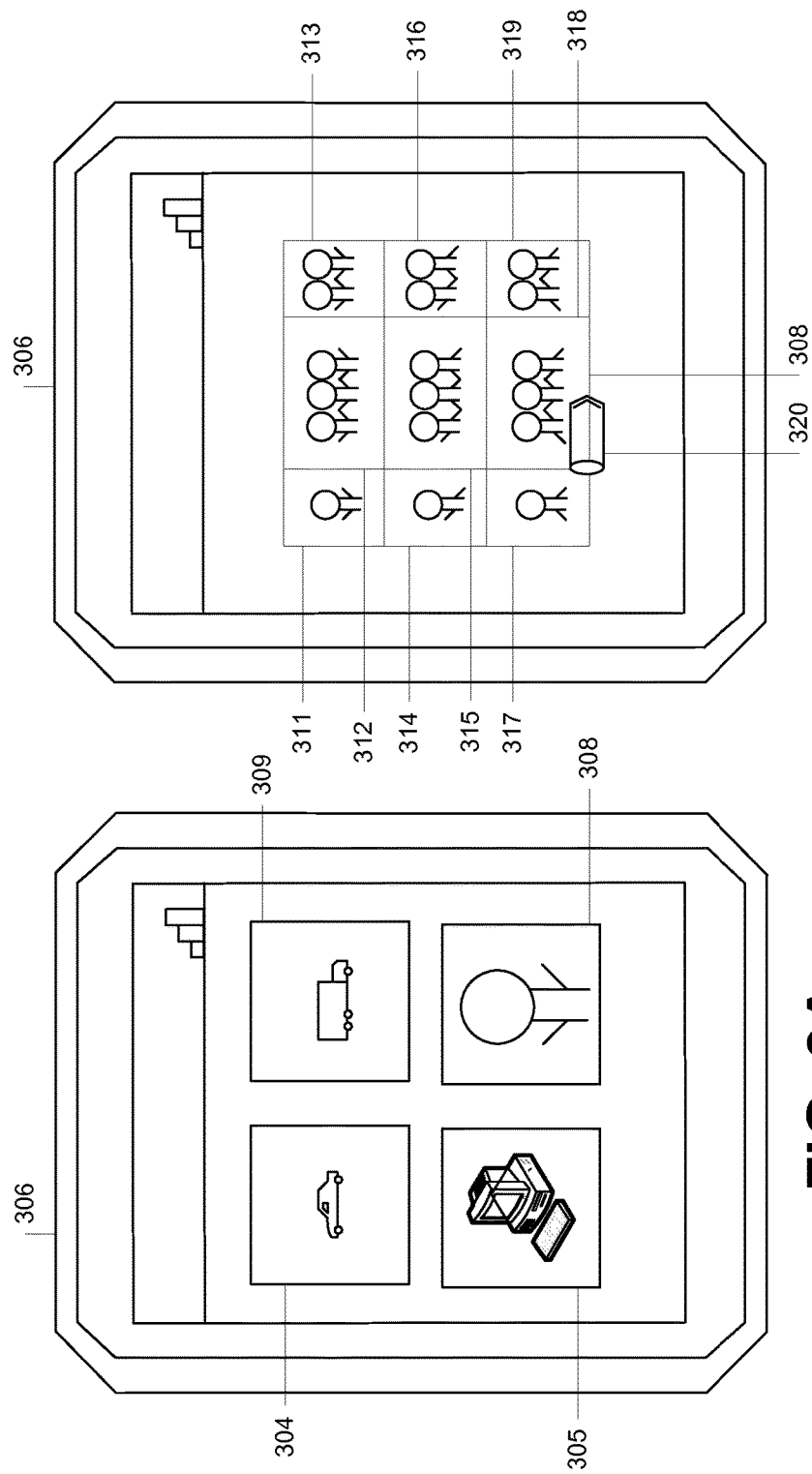

SYSTEM AND METHOD FOR PROVIDING A PREVIEW OF A DIGITAL PHOTO ALBUM

CROSS-REFERENCE TO RELATED APPLICATIONS

The present application claims the benefit of priority under 35 U.S.C. §119 from U.S. Provisional Patent Application Ser. No. 61/745,499, filed on Dec. 21, 2012, the disclosure of which is hereby incorporated by reference in its entirety for all purposes.

BACKGROUND

The subject technology generally relates to providing a preview, and in particular, relates to providing a preview of a digital photo album.

Users sometimes wish to view some, but not all, content associated with a digital photo album. However, this process may be time consuming and labor intensive.

SUMMARY

The disclosed subject technology relates to a computer-implemented method for providing a preview of a digital photo album. The method comprises displaying, on an electronic device, a representation of a digital photo album, the digital photo album including plural content items. The method further comprises detecting, on the electronic device, an interaction associated with the displayed representation of the digital photo album. The method further comprises determining that the interaction corresponds to a gesture that is maintained for a first threshold distance. The method further comprises providing, in response to the determination, a preview of the digital photo album for display, where the preview comprises one or more of the plural content items included within the digital photo album.

The disclosed subject technology further relates to a system for providing a preview of a digital photo album. The system includes one or more processors, and a machine-readable medium including instructions stored therein, which when executed by the processors, cause the processors to perform operations comprising displaying, on an electronic device, a representation of a digital photo album, the digital photo album including plural content items. The operations further comprise detecting, on the electronic device, an interaction associated with the displayed representation of the digital photo album. The operations further comprise determining that the interaction corresponds to a gesture that is maintained for a first threshold distance. The operations further comprise providing, in response to the determination, a preview of the digital photo album for display, where the preview comprises one or more of the plural content items included within the digital photo album. The operations further comprise determining that the gesture is maintained for a second threshold distance, where the second threshold distance exceeds the first threshold distance. The operations further comprise providing, in response to determining that the gesture that is maintained for the second threshold distance, one or more of the plural content items included within the digital photo album for display.

The disclosed subject technology further relates to a machine-readable medium including instructions stored therein, which when executed by a system, cause the system to perform operations including displaying, on an electronic device, a representation of a digital photo album, the digital photo album including plural content items. The operations further comprise detecting, on the electronic device, an interaction associated with the displayed representation of the digital photo album. The operations further comprise determining that the interaction corresponds to a gesture that is maintained for a first threshold distance. The operations further comprise providing, in response to the determination, a preview of the digital photo album for display, where the preview comprises one or more of the plural content items included within the digital photo album, and where the one or more of the plural content items are arranged to form a mosaic. The operations further comprise determining that the gesture is maintained for a second threshold distance, where the second threshold distance exceeds the first threshold distance. The operations further comprise providing, in response to determining that the gesture that is maintained for the second threshold distance, one or more of the plural content items included within the digital photo album for display.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

It is to be understood that both the foregoing general description and the following detailed description are exemplary and explanatory and are intended to provide further explanation of the subject technology as claimed.

BRIEF DESCRIPTION OF THE DRAWINGS

Certain features of the subject technology are set forth in the appended claims. However, for purpose of explanation, several embodiments of the subject technology are set forth in the following figures.

FIG. 3A illustrates an example screenshot of representations of digital photo albums.

FIG. 3B illustrates an example screenshot of a preview of a digital photo album of FIG. 3A.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A system and method for providing a preview of a digital photo album is provided. An interaction associated with a displayed representation (e.g., a cover photo, etc.) of the digital photo album is detected on the electronic device. The digital photo album has a preview that contains content items (e.g., images, etc.) included within the digital photo album. The detected interaction is analyzed to determine if the interaction corresponds to a command to preview the digital photo album. According to example aspects, if detected interaction is determined to correspond to a swipe gesture across the electronic device, where the swipe gesture is maintained for at least a first threshold distance, then the preview is provided for display. Furthermore, if the detected interaction corresponds to a hover action that is maintained for a threshold period of time, then the preview is also provided for display. An animation may be provided to transition from the displayed representation to the preview.

The detected interaction may also correspond to a command to view content items that are associated with the photo album. According to example aspects, if the detected interaction corresponds to a swipe gesture that is maintained for a second threshold distance, where the second threshold distance exceeds the first threshold distance, then content items associated with the digital photo album are provided for display.

Figure 1:
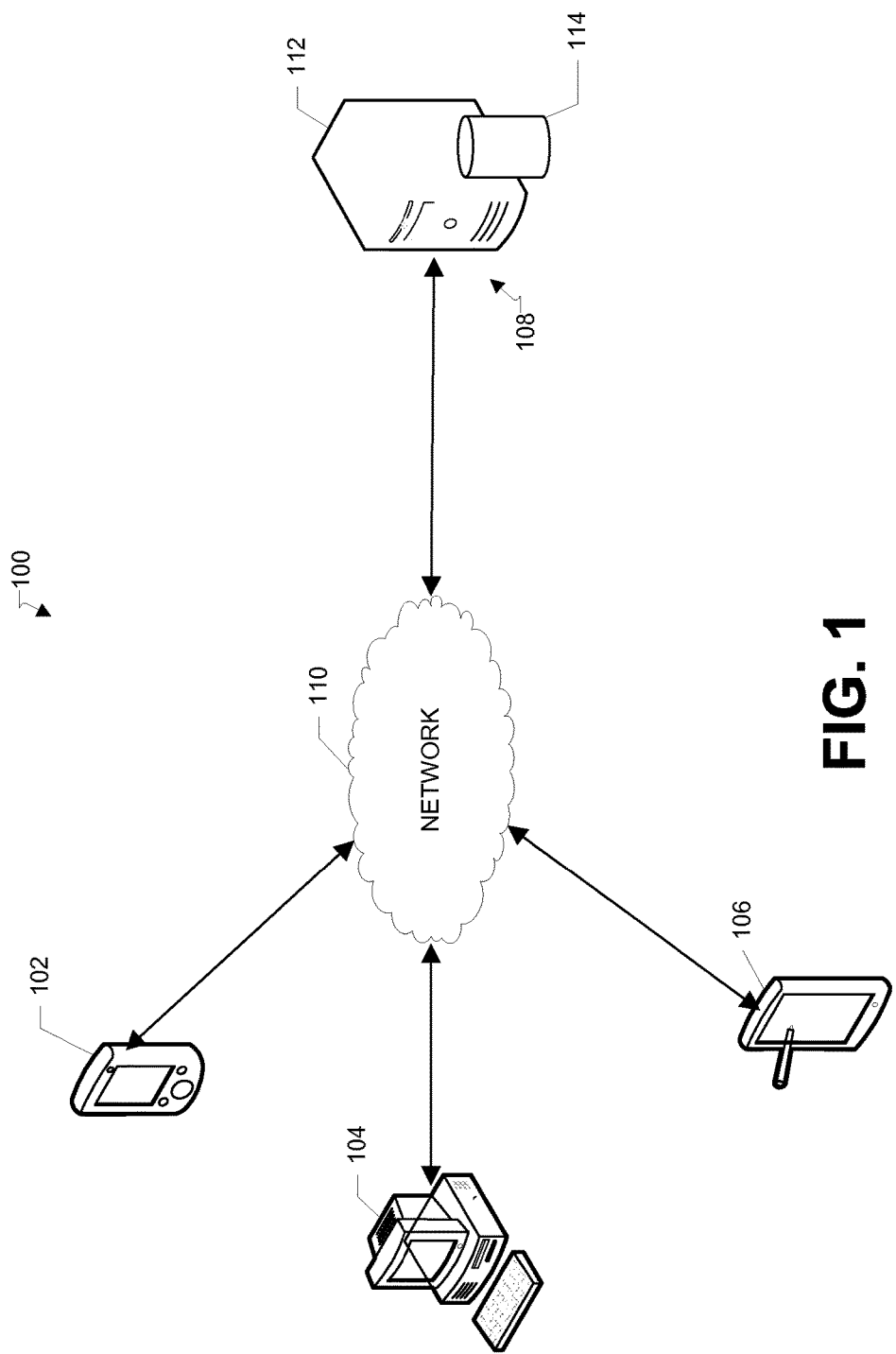
FIG. 1 illustrates an example network environment for providing a preview of a digital photo album.

FIG. 1 illustrates an example network environment for providing a preview of a digital photo album. A network environment 100 includes electronic devices 102, 104, and 106 communicably connected to a server 108 by a network 110. Server 108 includes a processing device 112 and a data store 114. Processing device 112 executes computer instructions stored in data store 114, for example, to access content items that are associated with digital photo albums and to transmit the content items to electronic devices 102, 104, and 106.

Electronic devices 102, 104, and 106 can be mobile devices (e.g., smartphones, tablet computers, PDAs, and laptop computers), portable media players, desktop computers or other appropriate computing devices. In the example of FIG. 1, electronic device 102 is depicted as a smartphone, electronic device 104 is depicted as a desktop computer, and electronic device 106 is depicted as a tablet computer.

Server 108 may be any system or device having a processor, memory, and communications capability to access content items that are associated with digital photo albums and to transmit the content items to electronic devices 102, 104, and 106. Server 108 may be a single computing device such as a computer server. Server 108 may also represent more than one computing device working together to perform the actions of a server computer.

According to example aspects, a representation of a digital photo album is provided for display on electronic device 102, 104, or 106. Electronic device 102, 104, or 106 detects an interaction that is associated with the displayed representation of the digital photo album. Electronic device 102, 104, or 106 then determines if the interaction corresponds to a swipe gesture that is maintained for a first threshold distance. Electronic device 102, 104, or 106 then provides a preview of the digital photo album for display, where the preview includes one or more of the plural content items included within the digital photo album.

According to example aspects, the one or more of the plural content items are stored in a hardware component of electronic device 102, 104, or 106. According to other example aspects, the one or more of the plural content items are stored in data store 114 of sever 108. In this case, the electronic device 102, 104, or 106 requests server 108 to transmit the one or more of the plural content items to electronic device 102, 104, or 106, via network 110.

Network 110 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
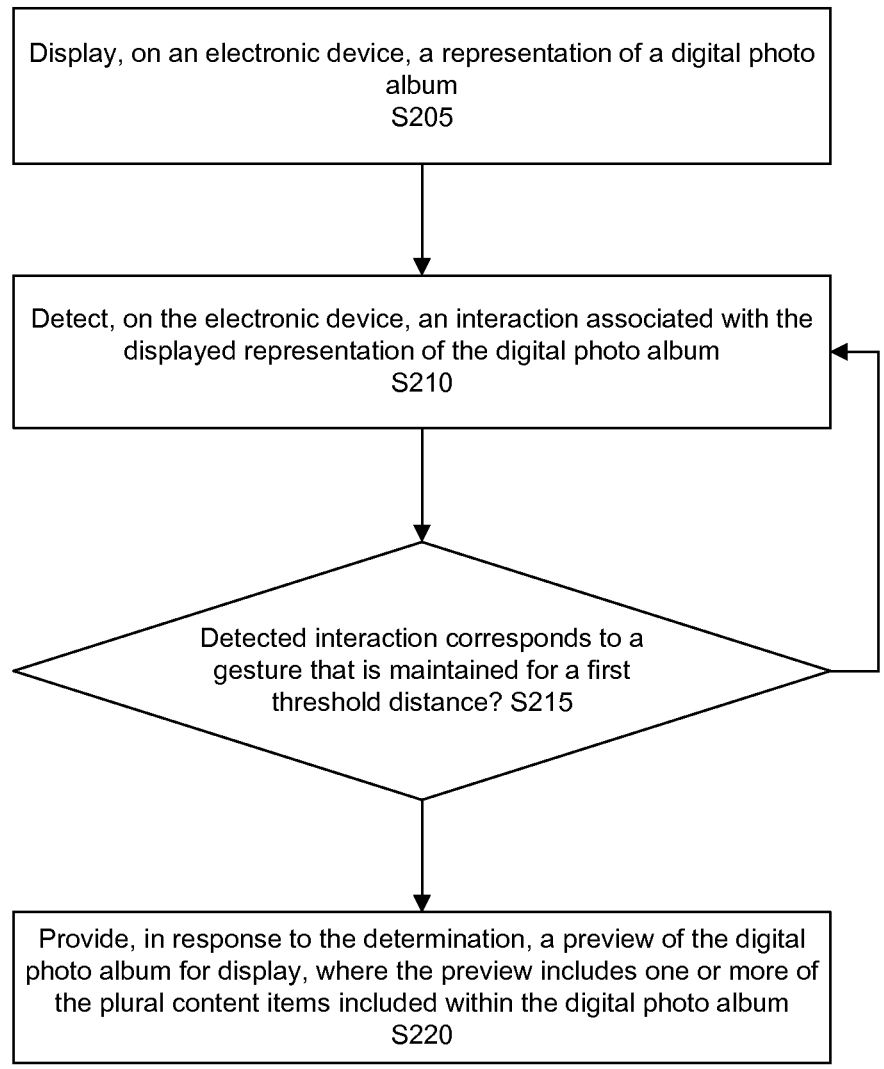
FIG. 2 illustrates an example process for providing a preview of a digital photo album.

FIG. 2 illustrates an example process for providing a preview of a digital photo album. Although the operations in process 200 are shown in a particular order, certain operations may be performed in different orders or at the same time. In addition, although process 200 is described with reference to the system of FIG. 1, process 200 is not limited to such and can be performed by other system(s).

In block S205, a representation of a digital photo album is displayed on electronic device 102. In block S210, an interaction associated with the displayed representation of the digital photo album is detected. In block S215, if the detected interaction is determined to correspond to a gesture that is maintained for a first threshold distance, then the process proceeds to block S220. According to example aspects, the determined gesture corresponds to a swipe gesture. The determined gesture may also correspond to a tap gesture. Furthermore, if the detected interaction corresponds to a hover gesture that is maintained for a first threshold period of time, then the process also proceeds to block S220. A content item that provides a transition from the displayed representation to the preview may also be provided for display. According to example aspects, the content item may be an animation.

In block S220, a preview of the digital photo album is provided for display in response to determining that the interaction corresponds to a swipe gesture that is maintained for the first threshold distance. According to example aspects, the displayed preview contains previews of one or more content items of the digital photo album, where the previews of one or more content items are arranged to form a mosaic. The previews of the one or more content items may also be arranged to form a stack or another shape. The one or more of the plural content items may be stored in a hardware component of electronic device 102, 104, or 106. Alternatively, the one or more of the plural content items may be stored on server 108.

According to example aspects, if the detected gesture corresponds to a swipe gesture that is maintained for a second threshold distance, where the second threshold distance exceeds the first threshold distance, full views of one or more of the content items that are associated with the digital photo album are provided for display. Furthermore, if the detected gesture corresponds to a hover action that is maintained for a second threshold period of time, where the second threshold period of time exceeds the first threshold period of time, full views of the one or more content items that are associated with the digital photo album are provided for display. A content item that provides a transition from the displayed previews of the one or more content items to full views of the one or more content items may be provided for display. In block S220, if the detected interaction is not determined to correspond to a swipe gesture that is maintained for at least the first threshold distance, then the process returns to block S210.

FIG. 3A illustrates an example screenshot of representations of digital photo albums. As shown in FIG. 3A, digital representations of digital photo albums 304, 305, 308, and 309 are provided for display on tablet computer 306. According to other example aspects, a different number of digital representations may be provided for display on tablet computer 306. Furthermore, a different type of electronic device (e.g., a smartphone device 102, a desktop computer 104, a laptop computer, etc.) may also provide digital photo albums 304, 305, 308, and 309 for display. Each of digital photo albums 304, 305, 308, and 309 includes multiple content items that are associated with the respective digital photo album. A user may access content items that are associated with digital photo albums 304, 305, 308, and/or 309 by executing a number of interactions (e.g., a swipe action, a hover action, a click action, or a tap action, etc.) with respect to tablet computer 306.

FIG. 3B illustrates an example screenshot of a preview of digital photo album 308 of FIG. 3A. As shown in FIG. 3B, a user slide action 320 is initiated on a portion of tablet computer 306 where the digital representation of digital photo album 308 is displayed. When the user slide action exceeds a first threshold distance, a preview is provided. According to example aspects, the preview may also be provided in response to additional user interactions (e.g., a user hover action, a user tap action, a user click action, etc.) with respect to the digital representation of digital photo album 308. One or more visual effects may be provided to transition from the displayed representation of a digital photo album to a preview of the digital photo album. According to example aspects, the visual effects may include an animation that is displayed immediately after user action 320.

As shown in FIG. 3B, the preview includes previews of content items 311-319, which are associated with digital photo album 308. The number of previews of content items 311-319 displayed may be based on the total number of content items that are associated with the digital photo album, physical dimensions of the display screen, prior user preference, etc. As shown in FIG. 3B, previews of content items 311-319 are organized to form a mosaic. According to other example aspects, previews of content items may form a stack or another shape. Previews of content items 311-319 may be displayed one at a time in a particular order (e.g., from left to right, from top to bottom, etc.). Alternatively, any combination of previews of content items 311-319 may be displayed at the same time. According to example aspects, previews of content items are ranked based on perceived user interest and only previews of top ranked (e.g., previews of top 9 content items, etc.) are provided for display. According to other example aspects, previews of content items are randomly selected and provided for display.

Figure 3C:
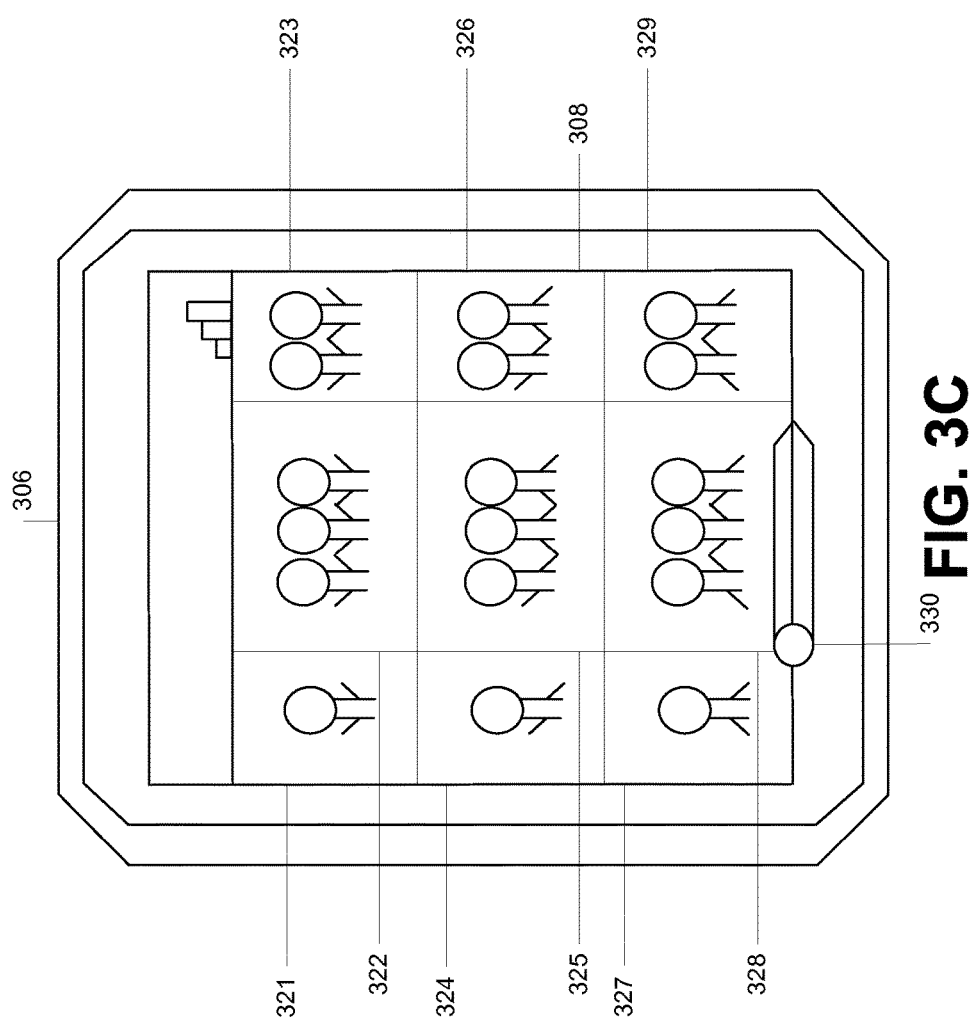
FIG. 3C illustrates an example screenshot of content items of a digital photo album of FIG. 3A.

FIG. 3C illustrates an example screenshot of content items of digital photo album 308 of FIG. 3A. As shown in FIG. 3C, full views of content items 321-329 correspond to previews 311-319 and are provided for display in response to a user slide action that exceeds a second threshold distance, where the second threshold hold distance exceeds the first threshold distance. According to example aspects, full views of content items associated with the digital photo album may also be provided in response to additional user interactions (e.g., a user hover action, a user tap action, a user click action, etc.) with respect to the digital representation of digital photo album 308. One or more visual effects may be provided to transition from displaying previews of content items that are associated with a digital photo album to displaying full views of content items that are associated with the digital photo album. According to example aspects, the visual effects may include an animation that is displayed immediately after user action 320 for a period of time.

As shown in FIG. 3C, full views of content items 321-329 have greater physical dimensions relative to their corresponding previews 311-319. The number of full views of content items that are displayed may be based on the total number of content items that are associated with the digital photo album, physical dimensions of the display screen, prior user preference, etc. As shown in FIG. 3C, full views of content items 321-329 are organized to form a mosaic. According to other example aspects, full views of content items form a stack or another shape.

Full views of content items 321-329 may be displayed one at a time and in a particular order. Alternatively, any combination of full views of content items 321-329 may be displayed at the same time. The user may select any one of content items 321-329 to further interact with the selected content item. According to example aspects, a user interaction (e.g., a user tap action, etc.) with respect to content item 321 further increases the physical dimension of content item 321 with respect to the display screen of tablet computer 306, where content item 321 overlays content items 322-329.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
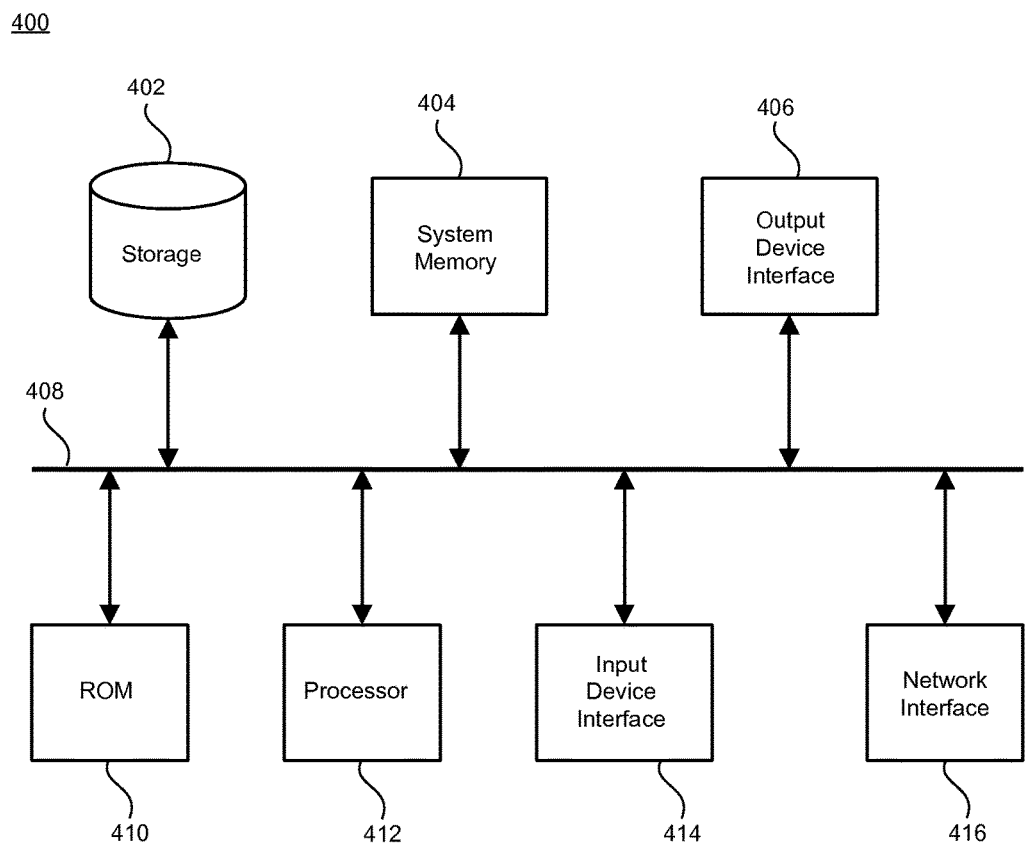
FIG. 4 conceptually illustrates an electronic system with which some implementations of the subject technology are implemented.

FIG. 4 conceptually illustrates an electronic system with which some implementations of the subject technology are implemented. Electronic system 400 can be a laptop computer, a desktop computer, smartphone, PDA, a tablet computer or any other sort of device 102, 104, and 106. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's electronic device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to an electronic device (e.g., for purposes of displaying data to and receiving user input from a user interacting with the electronic device). Data generated at the electronic device (e.g., a result of the user interaction) can be received from the electronic device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing a preview of a digital photo album, the method comprising:

displaying, on a display of an electronic device, a plurality of graphical representations of a plurality of digital photo albums, each of the digital photo albums including plural content items that are ranked based on perceived user interest;

detecting, on the electronic device, an input having an initial position associated with one of the displayed graphical representations of the plurality of digital photo albums;

determining that the input corresponds to a slide action that is maintained for a first threshold distance;

providing, in response to the determination, a preview of the digital photo album associated with the initial input position for display, wherein the preview comprises previews of a subset of the ranked plural content items included within the digital photo album that exceed a rank threshold, the subset previews having first sizes on the display;

determining that the slide action is maintained for a second threshold distance, wherein the second threshold distance exceeds the first threshold distance;

providing, in response to determining that the slide action is maintained for the second threshold distance, full views of the content items included in the preview, the full views having second sizes with greater physical dimensions than the first sizes of the corresponding previews;

detecting, on the electronic device, a hover action that is maintained for a threshold period of time at a position associated with the content item of a first full view; and displaying, in response to the detection of the hover action, the content item of the first full view at a third size having greater physical dimensions than the second size of the first full view, wherein the displayed content item overlays the full views of the content items at the second sizes.

2. The computer-implemented method of claim 1, wherein the slide action comprises a swipe gesture on a touchscreen.

3. The computer-implemented method of claim 1, wherein the slide action comprises movement of a cursor control device.

4. The computer-implemented method of claim 1, further comprising providing, in response to the determining the slide action is maintained for the first distance, one of the plural content items, wherein the one of the plural content items is provided to transition from the displayed graphical representation to the preview.

5. The computer-implemented method of claim 1, wherein the subset previews are arranged to form a mosaic.

6. The computer-implemented method of claim 1, wherein the subset previews are arranged in a stack.

7. The computer-implemented method of claim 1, wherein the plural content items of the digital photo album are stored on a hardware component of the electronic device.

8. The computer-implemented method of claim 1, wherein the plural content items of the digital photo album are stored on a server.

9. A system for providing a preview of a digital photo album, the system comprising:
   one or more processors; and
   a machine-readable medium comprising instruction stored therein, which when executed by the processors, cause the processors to perform operations comprising:
      displaying, on a display of an electronic device, a plurality of graphical representations of a plurality of digital photo albums, each of the digital photo albums including plural content items;
      detecting, on the electronic device, an input having an initial position associated with one of the displayed graphical representations of the plurality of digital photo albums;
      determining that the input corresponds to a slide action that is maintained for a first threshold distance;
      providing, in response to the determination, a preview of the digital photo album associated with the initial input position for display, wherein the preview comprises content previews of one or more of the plural content items included within the digital photo album, the content previews having first sizes on the display;
      determining that the slide action is maintained for a second threshold distance, wherein the second threshold distance exceeds the first threshold distance;
      providing, in response to determining that the slide action is maintained for the second threshold distance, full views of the content items included in the preview, the full views having second sizes with greater physical dimensions than the first sizes of the corresponding content previews;
      detecting, on the electronic device, a hover action that is maintained for a threshold period of time at a position associated with the content item of a first full view; and
      displaying, in response to the detection of the hover action, the content item of the first full view at a third size having greater physical dimensions than the second size of the first full view, wherein the displayed content item overlays the full views of the content items at the second sizes.

10. The system of claim 9, wherein the slide action comprises a swipe gesture on a touchscreen.

11. The system of claim 9, wherein the slide action comprises movement of a cursor control device.

12. The system of claim 9, wherein the operations further comprise providing, in response to the determining the slide action is maintained for the first distance, one of the plural content items, wherein the one of the plural content items is provided to transition from the displayed graphical representation to the preview.

13. The system of claim 9, wherein the content previews are arranged to form a mosaic.

14. The system of claim 9, wherein the content previews are arranged in a stack.

15. A non-transitory machine-readable medium comprising instructions stored therein, which when executed by a system, cause the system to perform operations comprising:
   displaying, on a display of an electronic device, a plurality of graphical representations of a plurality of digital photo albums, each of the digital photo albums including plural content items;
   detecting, on the electronic device, an input having an initial position associated with one of the displayed graphical representations of the plurality of digital photo albums;
   determining that the input corresponds to a first hover action that is maintained for a first threshold period of time;
   providing, in response to the determination, a preview of the digital photo album associated with the initial input position for display, wherein the preview comprises content previews of one or more of the plural content items included within the digital photo album, the content previews having first sizes on the display;
   determining that the first hover action is maintained for a second threshold period of time, wherein the second threshold period of time exceeds the first threshold period of time; and
   providing, in response to determining that the first hover action is maintained for the second threshold period of time, full views of the content items included in the preview, the full views having second sizes with greater physical dimensions than the first sizes of the corresponding content previews;
   detecting, on the electronic device, a second hover action that is maintained for a third threshold period of time at a position associated with the content item of a first full view; and
   displaying, in response to the detection of the second hover action, the content item of the first full view at a third size having greater physical dimensions than the second size of the first full view, the displayed content item overlaying the full views of the content items at the second sizes.

* * * * *